(12) United States Patent
Lear

(10) Patent No.: US 6,912,509 B1
(45) Date of Patent: Jun. 28, 2005

(54) INVESTMENT PORTFOLIO SELECTION

(76) Inventor: James A. Lear, 4707 Canyonwood Dr., Austin, TX (US) 78735

(*) Notice: Subject to any disclaimer, the term of this patent is extended or adjusted under 35 U.S.C. 154(b) by 0 days.

(21) Appl. No.: 09/492,439

(22) Filed: Jan. 27, 2000

(51) Int. Cl.$^7$ ............................................. G06F 17/60
(52) U.S. Cl. ......................................... 705/36; 705/37
(58) Field of Search .................................. 705/25–40

(56) References Cited

U.S. PATENT DOCUMENTS

| | | | | |
|---|---|---|---|---|
| 5,761,442 A | * | 6/1998 | Barr et al. ..................... | 705/36 |
| 5,784,696 A | | 7/1998 | Melnikoff ..................... | 705/36 |
| 5,812,987 A | | 9/1998 | Luskin et al. ................. | 705/36 |
| 5,864,828 A | | 1/1999 | Atkins ......................... | 705/36 |
| 5,884,285 A | | 3/1999 | Atkins ......................... | 705/36 |
| 5,987,433 A | | 11/1999 | Crapo ......................... | 705/36 |
| 6,018,722 A | * | 1/2000 | Ray et al. ..................... | 705/36 |

FOREIGN PATENT DOCUMENTS

WO          WO 95/06290       *  3/1995

OTHER PUBLICATIONS

Cavaletti, "Where to turn for risk management software", Futures, v26 n4 p60(2) Apr. 1997, Dialog file 256, Accession No. 00102372.*

<<Active Management>> Thomas, Lee R., III, Journal of Portfolio Management, v26, Issue 2, pp25–342, Year 2000.*

* cited by examiner

Primary Examiner—Frantzy Poinvil
(74) Attorney, Agent, or Firm—Kenneth C. Brooks

(57) ABSTRACT

A system for and method of investing a lump sum amount in order to return N periodic installments at a specified confidence level. A set of candidate investment instruments is selected from a universe of investment instruments. Data regarding the returns of the candidate investment vehicles during preceding periods is collected. Based on the data, minimum expected returns at the confidence level (MER) from each investment vehicle at the return date of each installment is compiled. Investment vehicles are selected for each of the N periods, with the selection criteria maximizing the MER for each of the respective periods. A normalization factor is developed that is based on the MERs of the selected investment vehicles, for the associated respective periods. An amount is allocated to each selected investment vehicle, and the allocated amount is established in accordance with a respective investment factor attributed to each investment vehicle, where the investment factor is based on the MER of the investment vehicle at a corresponding installment date.

21 Claims, 4 Drawing Sheets

INVESTMENT PORTFOLIO SELECTION

BACKGROUND OF THE INVENTION

1. Field of the Invention

The subject invention relates to financial management techniques and, more particularly, to a system and method for objectively investing a lump sum amount to provide installments at periodic intervals, with a predetermined level of confidence.

2. Description of the Related Art

Investors, including even experienced or professional investors, often make investment selections on based on intuition or, at best, a subjective synthesis of accumulated information. This is true even though the investment decisions are intended to be predicted on the investor's willingness to accept, or aversion to, risk of loss of investment capital. That is, although classes of investment vehicles can be qualitatively ranked according to the risk they appear to present, there exists no known practicable technique for quantitatively and objectively admitting risk as a factor that is informed by quantified consideration of the investor's tolerance to that risk. Therefore, it is desirable to provide investors with a technique for making investments with a predetermined level of confidence regarding the return that can be expected. As an exemplary application, it is eminently desirable that the technique enable investors to construct an investment portfolio with a view to receiving periodic payments in retirement. Many investors' needs would be well suited by the ability to allocate portions of a lump sum, such as an inheritance, or a retirement distribution, among disparate investment instruments. With respect to each portion, the investor should be able to know, with a predetermined level of confidence, that each portion invested will yield a stated return at a given time in the future. Although investors almost universally understand that in order to realize increasing investment returns, one must be willing to assume greater risk degrees, the effects of risk/return decisions have not heretofore been susceptible of precise articulation. Consequently, investors have been compelled to approach the inherent balancing requirement with little objective or quantitative guidance. As a result, investors have not been required, or enabled, to quantify their tolerance to risk and to confront the manner in which risk-driven investment selections directly affect the probabilistic investment returns. Accordingly, investment selections often present real risk/return relationships markedly different from that which the investor may intuit.

Therefore, what is desired is an approach to investment selection that objectively and quantitatively incorporates risk as a determinant in investment selections and, moreover, enables an investor to comprehend, objectively and quantitatively, the correlation between risk and the expected returns of available investments.

SUMMARY OF THE INVENTION

The above and other objects, advantages and capabilities are achieved in one aspect of the invention by a method of investing a lump sum amount to provide periodic investment withdrawals in the future, with a predetermined level of confidence. The minimum expected returns at specified times ($MER_i$), at a given confidence level, of respective investment instruments are determined. The investment vehicle that provides the maximum $MER_i$ at each of a specified number of times is identified. A normalization factor is determined from the $MER_i$ associated with each of the identified investment vehicles, and an investment growth factor is determined for each investment vehicle. Accordingly, an amount derived from a normalized portion, and inversely proportional to the investment growth factor, is allocated to each investment vehicle, thereby providing the investor an expectation, with the predetermined level of confidence, of realizing a stream of investment income at discrete times in the future.

In another aspect, the invention inheres in a method of investing a lump sum, V, to provide respective payments, $P_i$, at each of N intervals where $N \geq 1$, with a confidence factor, CF. The method comprises the steps: (a) selecting, from a universe of investment vehicles, a set of candidate investment vehicles; (b) based on actual returns of each of the candidate investment vehicles during preceding intervals, determining with the confidence factor CF a respective minimum expected return, $MER_i$, for each of the candidate investment vehicles at each of the N intervals; (c) with each of the N intervals, associating the candidate investment vehicle that is characterized by the greatest value for $MER_i$; (d) calculating a normalization factor NF; (e) for each of the N intervals, calculating an investment growth factor $IF_i$; and (f) determining an investment amount $V_i$ equal to $$\frac{V}{NF \times IF_i}$$

corresponding to each of the N intervals.

The invention is likewise embodied in a program product for determining investment amounts that represent respective portions of a lump sum. The amounts are to be invested in investment vehicles so as to provide payments at N periodic intervals at a predetermined confidence level. The program product stores software instructions for: (a) determining, at a predetermined confidence level, the minimum expected return ($MER_i$) of each investment vehicle of a preselected set of investment vehicles at each of the N periodic intervals; (b) for each of the N periodic intervals, identifying the investment vehicle that is characterized by the greatest $MER_i$; and (c) allocating an investment portion to each of the identified investment vehicles, where the investment portion is determined by the $MER_i$ of the investment vehicle to which the investment portion is allocated and where the total of the allocated investment portions is substantially equal to the lump sum.

The invention may also be incorporated into a system for allocating portions of a lump sum to investment vehicles so as to enable investment withdrawals at N intervals, at a predetermined confidence interval. The system comprises a data storage device storing data regarding the actual returns of investment vehicles during preceding investment periods and also comprises a program product operable to access the data storage device and to execute program instructions for (i) determining, at the predetermined confidence level, the minimum expected return at each of in N intervals ($MER_i$), of each of the investment vehicles; (ii) for each of the N periodic intervals, identifying the investment vehicle that provides the greatest $MER_i$; and (iii) allocating an investment portion to each of the investment vehicles identified in (ii) above, where the investment portion is determined by the $MER_i$ of the investment vehicle to which the investment portion is allocated and where the sum of the allocated investment portions is substantially equal to the lump sum.

In yet another embodiment, the invention is utilized as a method of investing a lump sum amount, V, so as to realize a series of investment withdrawals at N discrete times with a predetermined confidence level. The method comprises the steps: (a) based on historical periodic actual returns, determining a minimum expected normal return (MEQ) for each of a plurality of candidate investment instruments, at the predetermined confidence level; (b) adjusting the respective MEQs of each of the candidate investment instruments so as to yield a minimum expected return, $MER_i$ at each of the N times, for each of the candidate investment instruments; (c) for each of the N discrete times, identifying which of the candidate investment instruments exhibits the greatest $MER_i$; and (d) with respect to each of the N discrete times, allocating a portion, Vi, of the lump sum to the candidate investment vehicle that exhibits the greatest $MER_i$ where the allocated portion is determined by the following relationship:

$$V_i = \frac{V}{(1+MER_i)^{i+b-1} x \sum_{i=1}^{N} \frac{1}{(1+MER_i)^{i+b-1}}}$$

BRIEF DESCRIPTION OF THE DRAWINGS

The subject invention may be understood, and its numerous objects advantages and capabilities made apparent to those skilled in the art, with reference to the Drawings described below and attached hereto, and where.

DESCRIPTION OF THE PREFERRED EMBODIMENT(S) OF THE INVENTION

For a thorough understanding of the subject invention, reference is made to the following Description, including the appended claims, in connection with the above-discussed Drawings. In the context of the subject invention, risk may be understood as the probability that an investment does not achieve a stated minimum return. Conversely, the minimum expected return (MER) of an investment is the return that the investor may expect, given a certain level of risk. For example, assume that 90% of the time an investment returns more than 5% a year. Then there is a 10% probability (risk) that the 5% minimum expected return will not be realized. In a manner fully described below, the subject invention adopts the construct of risk as a primary basis for financial planning. Accordingly, as a prerequisite, the investor needs to be able to determine MER of different investment vehicles, at a given level of risk.

Figure 1:
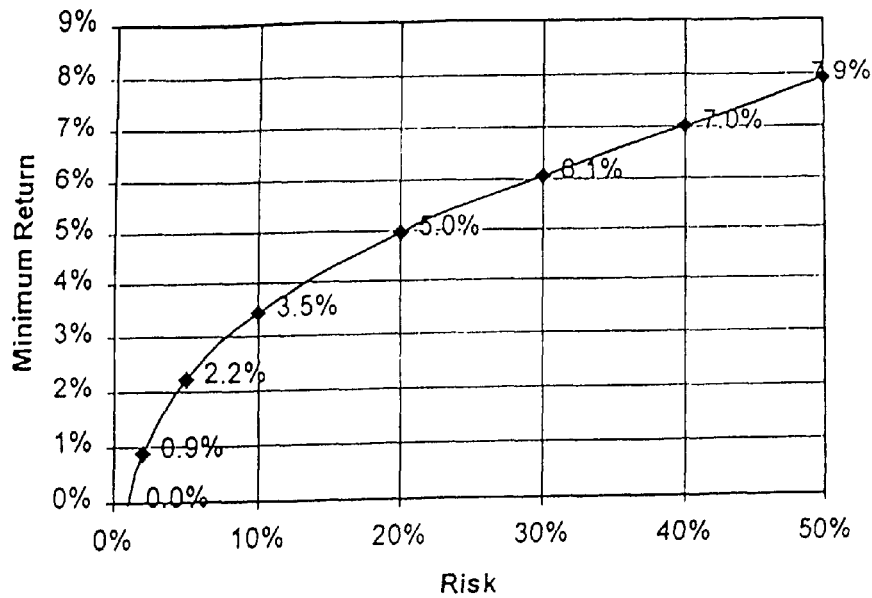
FIG. 1 is an exemplary money market fund risk/return curve.

Risk/return curves are a useful tool in assisting an investor or financial planner to determine an accurate expectation of return. Risk-return curves indicate the minimum return an investor should expect from an investment, with a given level of risk. For example, FIG. 1 represents a risk-return curve for typical money market mutual fund. An investor who can tolerate a 30% risk, may reasonably expect to only earn 6.1% or more during any one-year period. This is roughly tantamount to saying that about 30% of the years, this investment will return less than 6.1%. Conversely, in about 70% of the years, the money market fund will return 6.1% or more. On the other hand, an investor who can tolerate only a 10% risk should reasonably expect to earn only 3.5%. Clearly, although the investment vehicle is identical for a conservative or an aggressive investor, the expectations are very different.

Note that in FIG. 1, the risk ranges are from 0% to 50%. Of course, the MER with a 50% risk is simply the average annual return. This is consistent with the notion that no investor should rationally expect a return greater than the average return. In fact, it can be demonstrated empirically that there are virtually no investors so aggressive. Hence, the risk-return curve need not extend beyond the 50% risk. In addition, the only MER available to an investor with 0% risk is –100%. In other words, one can be certain only of not losing more than the entire initial investment, FIG. 1 reveals that the MER with 1% of risk is 0%. Because the risk/return curve drops precipitously between 1% and 0% of risk, this region of the risk/return curve is not depicted in FIG. 1.

Calculating the risk/return relationship of a given investment proceeds as follows and requires, as inputs, the risk tolerance of the investor, the average return of the investment, and the standard deviation of the investment returns. However, the calculation assumes the average and standard deviation are derived from a normally distributed random variable. Because, investment returns do not strictly conform to a normal distribution, mathematical corrections are required to convert actual returns into what will be called normal returns.

Central to the subject invention is a method for calculating the MER of an investment instrument based on accumulated historical data. The method treats the historical data initially as derived from a normally distributed variable, and then imparts a correction necessitated by that assumption. Assuming that data is available for a total M periods, and assuming further that $r_j$ is the return applicable to the $j^{th}$ period, then the following intermediate variables are defined:

$Q_j = 1n(1+r_j)$, and $$\overline{Q} = \frac{1}{M}\sum_{j=1}^{M} Q_j.$$

Using $$STDEV = \sqrt{\frac{1}{M}\sum_{i=1}^{M}(Q_i - \overline{Q})^2}$$

and the NORMINV functions that may be accessed in EXCEL software available from Microsoft Corporation, or derived using techniques such as Newton-Raphson solvers combined with the errfc estimation as described by William Press, et al. in *Numerical Recipes in C* (Cambridge University Press), and $MEQ_i$ may be calculated as follows:

$\sigma_Q = STDEV(Q_1, Q_2, \ldots, Q_M)$, and $MEQ_i = NORMINV(R, (i-1) \times \overline{Q}, \sigma_Q \times \sqrt{(i-1)})$, where R is the investor's risk tolerance and $\sigma_Q$ is the standard deviation exhibited by the calculated normal returns $Q_j$. $MEQ_i$ is the minimum expected normal return. Finally, the $MER_i$ for each interval is given by the relationship:

$$MER_i = e^{MEQ_i} - 1.$$

The above described methodology may be used to calculate the $MER_i$ for any number of investment instruments.

For example, Table 1 displays historical data derived from twenty years of returns from a popular money market mutual fund. The first column specifies the return (r) for each year and the second column contains the corresponding normal return. The average Q, $\overline{Q}$ and standard deviation are shown at the bottom. In this example, $\overline{Q}$ is 7.6% and the standard deviation $\sigma_Q$ is 3.3%.

TABLE 1

Money Market Fund Returns

| Year | r | Q = ln(r + 1) |
|---|---|---|
| 1 | 5.4% | 5.2% |
| 2 | 5.4% | 5.3% |
| 3 | 5.3% | 5.2% |
| 4 | 5.8% | 5.7% |
| 5 | 4.1% | 4.0% |
| 6 | 3.0% | 3.0% |
| 7 | 3.7% | 3.7% |
| 8 | 6.1% | 6.0% |
| 9 | 8.3% | 7.9% |
| 10 | 9.4% | 9.0% |
| 11 | 7.6% | 7.3% |
| 12 | 6.7% | 6.4% |
| 13 | 6.6% | 6.4% |
| 14 | 8.1% | 7.8% |
| 15 | 10.6% | 10.0% |
| 16 | 8.9% | 8.6% |
| 17 | 12.8% | 12.0% |
| 18 | 17.3% | 15.9% |
| 19 | 13.1% | 12.3% |
| 20 | 11.1% | 10.5% |
| Average Q = AVERAGE(Q) | | 7.6% |
| Standard deviation = STDEV(Q) | | 3.3% |

Once the average $\overline{Q}$ and $\sigma_Q$ have been calculated using NORMINV, MEQ may be determined and then converted to the MER. The results of this calculation and conversion are displayed in Table 2.

TABLE 2

Risk-return Calculations for Money Market Fund

| Risk | MEQ<br>MEQ = NORMINV (R, $\overline{Q}$, $\sigma_Q$) | MER = EXP(MEQ) − 1 |
|---|---|---|
| 1% | 0.0% | 0.0% |
| 2% | 0.9% | 0.9% |
| 5% | 2.2% | 2.2% |
| 10% | 3.4% | 3.5% |
| 15% | 4.2% | 4.3% |
| 20% | 4.8% | 5.0% |
| 30% | 5.9% | 6.1% |
| 40% | 6.8% | 7.0% |
| 50% | 7.6% | 7.9% |

Figure 2:
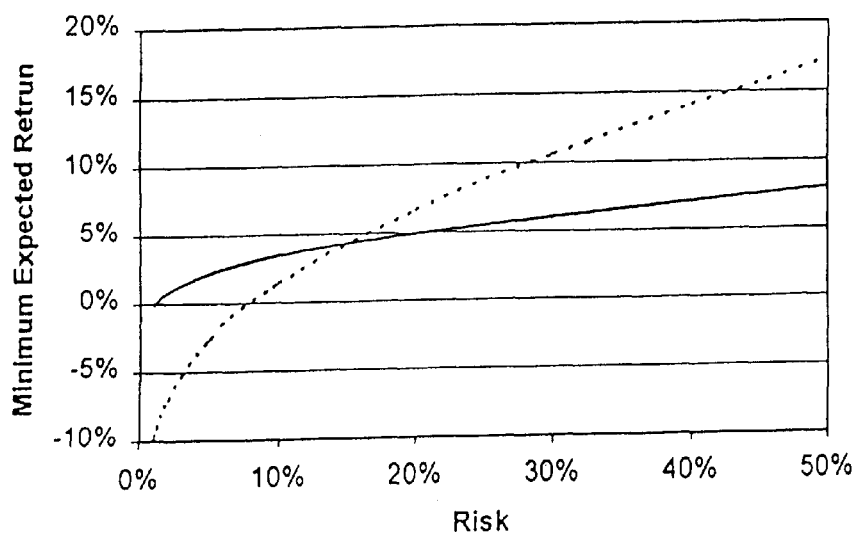
FIG. 2 depicts, for comparison purposes, stock fund and money market fund risk/return curves.

Risk-return curves may be used not only to verify expectations regarding investment returns, but also to determine an optimal investment portfolio, given an investor's risk tolerance. FIG. 2 depicts the risk-return curves for a popular equity find, together with the risk/return relationship of the money market fund. With access to this information, only investors with risk tolerances of 15% or less would rationally invest in the money market mutual fund for a one-year period. Investors willing to accept more than 15% risk will invest in the equity fund.

The concepts propounded above may be extended to compare many types of asset allocations. For example, risk-return curves can be calculated for portfolios comprising different investment assets: short-term bonds, money market funds, large cap equity, international, etc., or any various combinations. An optimal asset allocation can then be calculated based on the risk-return curves and the risk tolerance of the investor.

Figure 3:
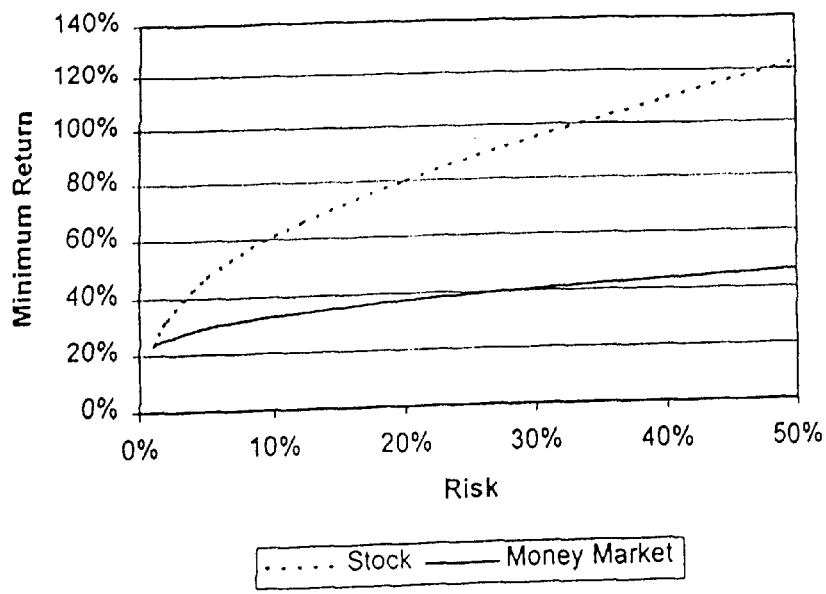
FIG. 3 depicts, for comparison purposes, typical 5-year stock fund and money market fund risk/return curves.

It is necessary to note that the risk-return curves outlined above are all derived from annual returns. In other words, the illustrated curves produced the MER: for investments held for one year. If investments are to be held for a shorter or longer periods, then the curves can change dramatically. Nevertheless, the average Q and standard deviation may easily be scaled for different time horizons. For example, suppose the historical investment return data is collected, or only available, on a yearly basis. If a proposed investment is to be held five years, then the 5-year average Q is 5 times the 1-year average Q. The 5-year standard deviation, however, is the 1-year standard deviation multiplied by the square root of 5. When the minimum returns are calculated, they represent total returns for five years. FIG. 3 shows the 5-year risk return curves for the money market and stock funds. Clearly, the stock market fund is more attractive for this duration to almost all but the most conservative investors.

Similarly, the investment period can be shorter than the data samples. If an investment will be held for six months, then the average Q and standard deviation would be multiplied by 0.5 and SQRT(0.5), respectively. Furthermore, data can be collected on monthly or weekly returns instead of annual returns, then scaled appropriately. To scale average monthly Q data and the associated standard deviation to years, the values would be multiplied by 12 and SQRT(12). These techniques eliminate the need for the method of rolling averages.

Figure 4:
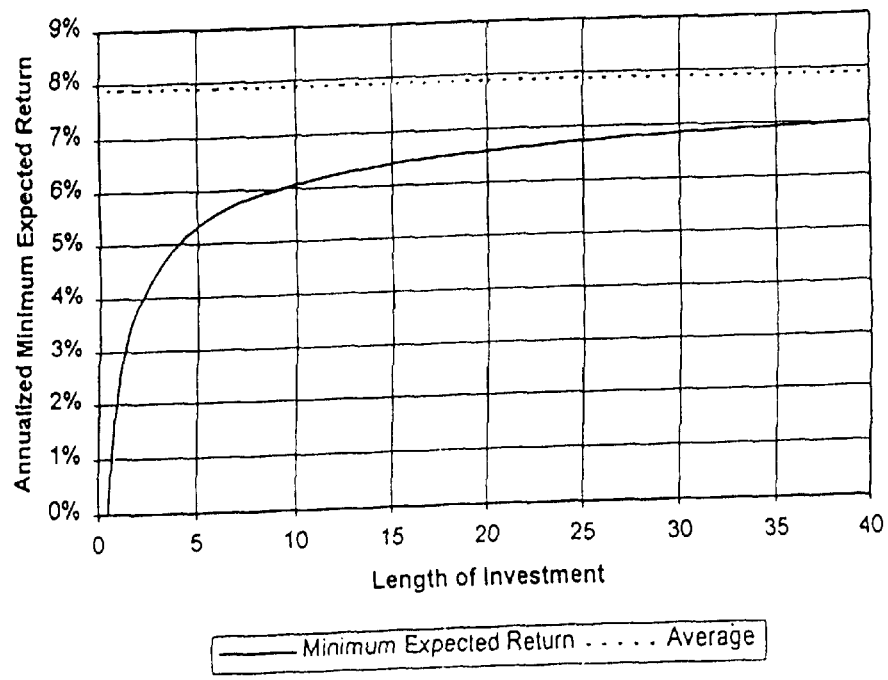
FIG. 4 depicts the annualized MER for a money market fund, with a 5% risk.

FIG. 4 is a plot of the MER for the money market fund. Instead of varying the risk, the risk is maintained constant at 5% and the length of time is varied. In addition, the MERs are annualized. The important aspect of this curve is that the MER will approach the average annualized return (7.9% as shown in the figure) as the investment time length is increased. An investor with a risk tolerance of 5% should expect to earn 2.2% for a one-year investment. This same investor, placing her money in the same fund but holding the fund for five years should expect to earn 5.3%, annualized over five years. In general, the longer an investment is held, the greater the MER.

Another interesting aspect of FIG. 4 is that the average annual return is equivalent to the MER for the investor with a 50% risk tolerance. In other words, if 50% had been using in creating the curve, rather than 5%, the result would be a horizontal line at the mean return. Because this MER curve does not vary, regardless of the time horizon, this investor will always invest in investments with the highest average returns. This implies that the investor will even invest entirely in stocks for a one-month period, or less. Typically, investors include at least some bonds or cash in the investments that will be held less than five years. It is likely that the most aggressive investors are closer to 35% risk tolerance rather than 50%.

Given the above, it is a straightforward matter to construct a table that summarizes and simplifies the risk-return curves for different time horizons for a given investment. These tables might categorize investors into four or five risk categories, such as very conservative, conservative, moderate, aggressive, and very aggressive. The tables might also categorize the time horizon into four or five ranges, such as one, two, five, ten, and twenty years. The resulting table of MER values for given time horizons and risk tolerances can then be quickly and easily used by investors and planners to gauge quality of an investment for their needs.

Often, funds are judged solely on average returns. As stated above, only investors who can tolerate 50% risk in their financial planning rationally invest based on average returns alone. Because there exists no investors who are willing to assume this much risk, this skewed view of the quality of an investment is of little value. Risk-return tables and curves can level the playing field, so that those funds that stabilize their returns can be appropriately matched to investors with more conservative outlooks or shorter time horizons. In addition, investments can be compared across investment classes using these tables or curves. For example, balanced funds can be directly and fairly compared to growth funds, and the appropriate fund can be matched to the investor.

Figure 5:
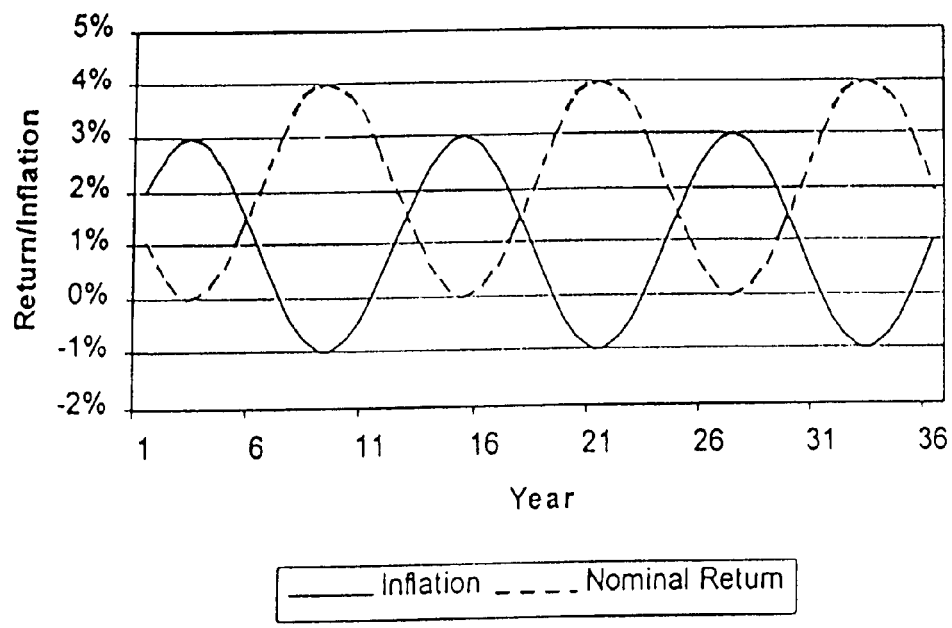
FIG. 5 illustrates the relationship between inflation and investment returns for a volatile investment.
Figure 6:
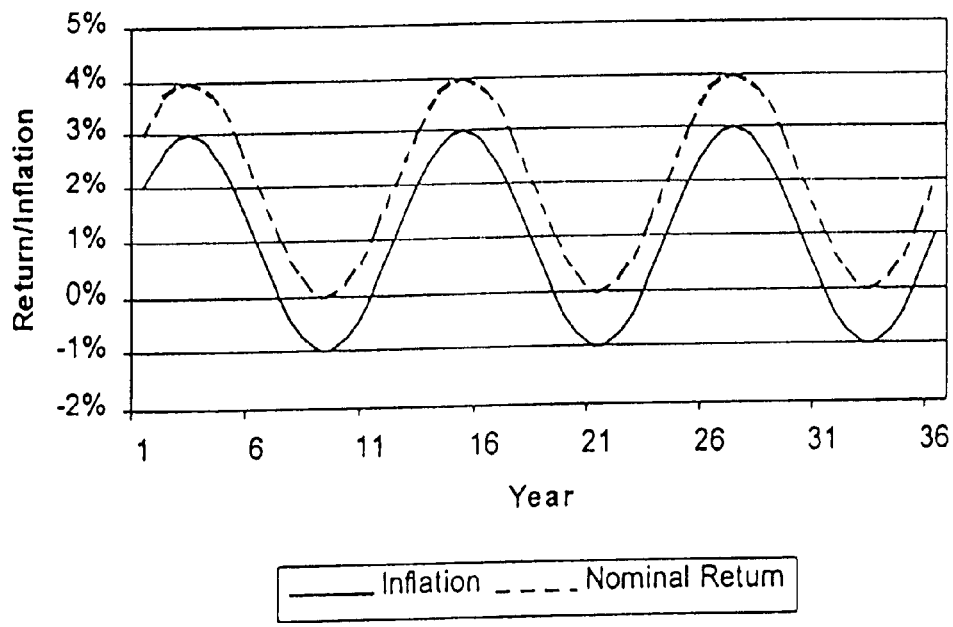
FIG. 6 illustrates the relationship between inflation and investment return for a stable investment.

In the interest of simplicity, inflation has not been discussed in the preceding sections. However, adjusting return data for inflation is vitally important before calculating distributions or confidence intervals. FIG. 5 shows inflation along with the annual returns from a hypothetical investment. In FIG. 5, the real returns after inflation fluctuate wildly. FIG. 6 shows another hypothetical investment with exactly the same mean and standard deviation as the first investment, but in this case the real returns are exactly 1%. The return is much more stable. Applying adjustments for inflation after the statistics have been calculated affects both investments equally, yet the investment in FIG. 6 clearly will provide an investor a much more stable real return. Consequently an investor who must rely on the investment's return for living expenses will experience feast or famine cycles with the first investment. Therefore, inflation adjustments should be made before statistical analysis, not after.

The above-described technique that enables the determination, from historical data that defines the returns of investment vehicles, of MER that correspond objectively to an investor's risk tolerance has widespread applicability. A number of applications that inform investment decisions on MERs correlated to risk tolerance have been suggested above. A significant application that has not been heretofore promulgated enables an investor to distribute among a number of investment vehicles aliquot portions of a lump sum amount so as to provide payments at a predetermined number of intervals. Distributions of a lump sum amount are often required when an investor receives an inheritance, takes a lump sum payment from a retirement benefit, and so forth. In addition, the lump sum investment may also represent an annual contribution to an IRA or 401 (K) account. For example, an individual might desire to invest a lump sum amount so as to receive periodic payments throughout a specified number of periods. The construct of risk-determined MER facilitates that distribution in the following manner.

Initially the investor will need to select the universe of investment vehicles that will be considered as investment candidates. The MERs of the candidate investment vehicles will be determined and used as a criteria on which to base the investment decisions. Of course, it is to be understood that conceptually the number of investment instruments to be included in the investment universe is limited, not by the subject invention per se, but rather by the practicability of obtaining historical data describing the seemingly infinite, yet growing, number of investment instruments that are currently available. It is suggested that the investor select a representative number of vehicles from each of the commonly considered classes: stocks, bonds, money market funds, etc. Another selection methodology might limit the universe of investment vehicles to mutual funds of different classes or with different objectives: aggressive growth, growth, growth and income, small cap, mid-cap, equity income, indexed, corporate bond, government bond, municipal bond, etc. As should now be readily apparent the set of investment vehicle candidates is not constrained by an inherent attribute of the subject invention, but will likely be limited by the computational capacity at the investor's disposal, and his attention span.

Once the universe of investment vehicle candidates has been circumscribed, the investor must decide, and quantify, his risk tolerance. Again, an alternative articulation: the investor must decide, and quantify, the level of confidence he requires in the MERs attributed to the selected investment vehicles. To say that the investor is willing to encounter no more than a 10% probability that he will not realize an MER is, of course, tantamount to saying that he must have a 90% level of confidence in realizing such an MER.

For each candidate investment vehicle, a number of MERs must be determined. Specifically, each $MER_i$ represents the MER at the $i^{th}$ interval at which the investor intends to realize an installment. If the investor intends to realize payments annually for each of twenty years, then i=(1, 2, . . . 19, 20). If the MER for an investment vehicle is based on, or calculated from, annual returns, then the $MER_i$ can be annualized according to the relationship:
$MER_i = exp(MEQ_i) - 1$, where $MEQ_i$ is calculated as explicated above. With $MER_i$ established for each of the twenty periods, and for each of the candidate investment vehicles, an optimum investment vehicle matched to each of the installment intervals is identified. The optimum investment vehicle is simply the investment vehicle with the largest $MER_i$ for the corresponding interval.

The portion of the lump sum to be invested in each vehicle is then proportional to the amount of the lump sum, divided by a normalization factor, NF, where:

$$NF = \sum_{i=1}^{N} \frac{1}{(1 + MER_i)^{i+b-1}}.$$

In the above relationship, the variable "b" represents the number of years between the initial investment allocation and the first of the periodic withdrawals. Specifically, if the amount to be invested for each period is referred to as $V_i$, and if the lump sum amount is referred to as $V_{total}$, then each $$V_i = \frac{V_{total}}{NF(1 + MER_i)^{i+b-1}}.$$

$(1+MER_i)^{i+b-1}$ may be denominated as the investment growth factor, $IF_i$, applied to the normalized lump sum so as to yield the aliquot portion to be allocated to each investment vehicle.

The above approach to investment allocation of a lump sum has a number of beneficial salient aspects. Paramount is that the risk of dissipating the lump sum prior to the expiration of the retirement period is eliminated.

Furthermore, the return that will be realized each year will be above a minimum amount that can be calculated, with a probability equal to the confidence level, (1-Risk). Furthermore, the risk that the realized income will fall below the expected minimum has been preestablished by the investor.

Figure 7:
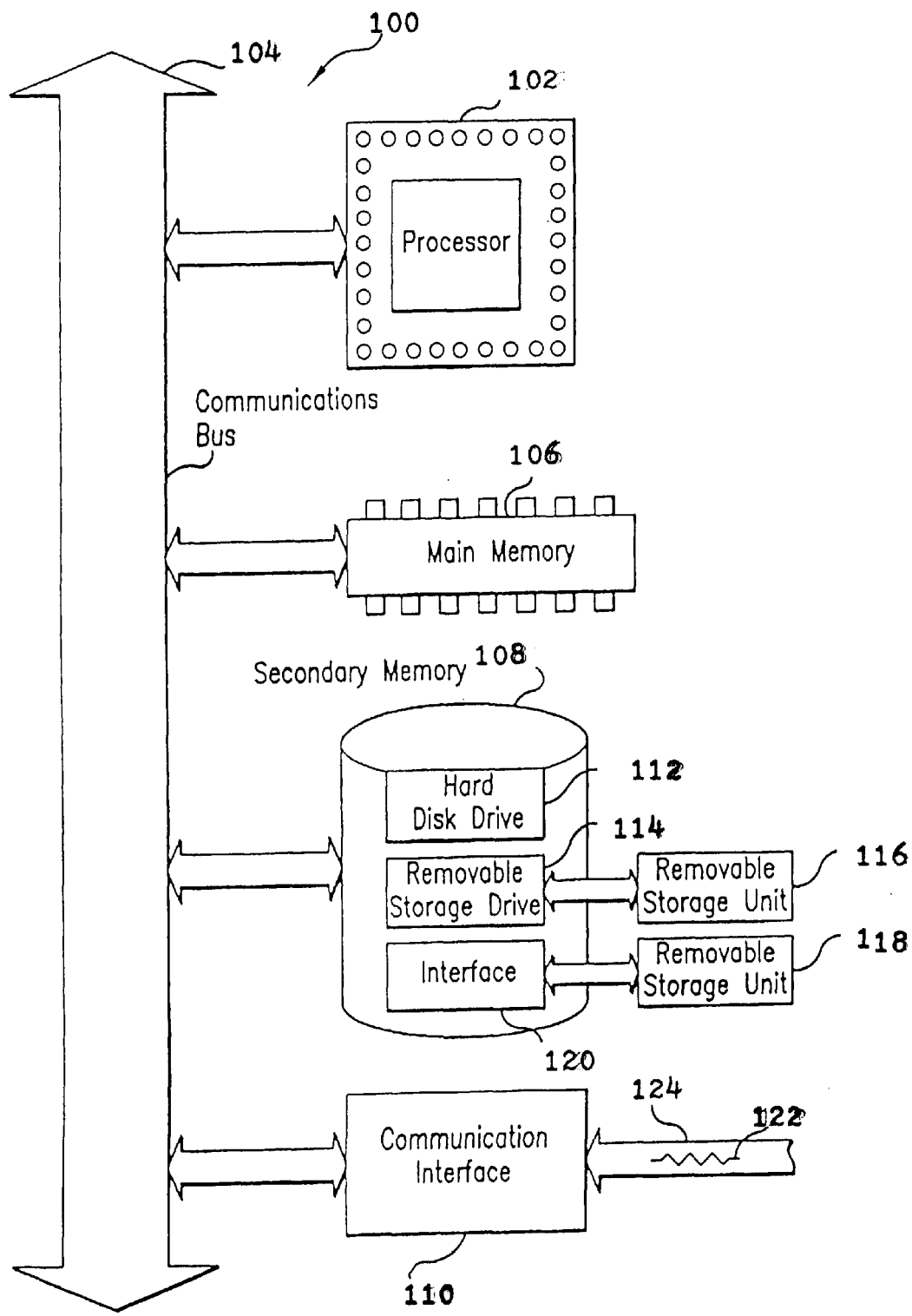
FIG. 7 is a block diagram of a computer system suitable for implementing the present invention.

FIG. 7 depicts a computer system 100 that includes one or more processors, such as processor 102 connected to a communication bus 104. A main memory 106, such as a random access memory (RAM), as well as a secondary memory 108 and a communication interface 110 are all in data communication over communication bus 104. Secondary memory 108 can include, for example, a hard disk drive 112 and/or a removable storage drive 114, representing a floppy disk drive, a magnetic tape drive, an optical disk drive, or the like. Removable storage drive 114 reads from and/or writes to a removable storage unit 116 in a well known manner. Removable storage unit 116, represents a floppy disk, magnetic tape, optical disk, or the like, which is read by and written to by removable storage drive 114. As will be appreciated, the removable storage unit 116 is a computer usable storage medium having stored therein computer software and/or data.

In alternative embodiments, secondary memory 108 may include other similar means for allowing computer programs or other instructions to be loaded into computer system 100. Such means can include, for example, a removable storage unit 118 and an interface 120. Examples of such can include a program cartridge and cartridge interface (such as that found in video game devices), a removable memory chip (such as an EPROM, or PROM) and associated socket, and other removable storage units 118 and interfaces 120 which allow software and data to be transferred from the removable storage unit 118 to computer system 100.

Communications interface 110 allows software and data to be transferred between computer system 100 and external devices. Examples of communications interface 110 can include a modem, a network interface (such as an Ethernet card), a communications port, a PCMCIA slot and card, etc. Software and data transferred via communications interface 110 are in the form of signals which can be electronic, electromagnetic, optical or other signals capable of being received by communications interface 110. These signals 122 are provided to communications interface via a channel 124. This channel 124 carries signals 122 and can be implemented using wire or cable, fiber optics, a phone line, a cellular phone link, an RF link and other communications channels.

Although the invention has been described with reference to the specific techniques for calculating MEQ, MER and other variables, the invention is not limited to reliance on such techniques. Various modifications, additions or improvements may be devised or recognized by those with skill in the art; and such modifications, additions or improvements are properly comprehended as within, or equivalent to, the scope of the invention as defined by the appended claims.

What is claimed is:

1. A computerized method of investing a lump sum, V, to provide N periodic payments at N equally spaced intervals, with the first of the periodic payments to be made b periods subsequent to the investment, the method comprising the steps:

(a) determining an investor's risk tolerance, R;

(b) determining the minimum expected return ($MER_i$), at the risk tolerance R, of each investment vehicle in a predetermined set of investment vehicles, at each of the N equally spaced intervals;

(c) for each of the N intervals, identifying the investment vehicle that is characterized by the greatest $MER_i$;

(d) calculating a normalization factor, NF, that is based on the respective MERs of each of the investment vehicles identified in Step (c);

(e) calculating an investment growth factor, $IF_i$, for each interval that is based on the respective $MER_i$ that is identified for the interval; and (f) investing an amount equal to $$\frac{V}{IF_i \times NF}$$

in each of the investment vehicles identified in Step (c).

2. The method as defined in claim 1 above, wherein $$NF = \sum_{i=1}^{N} \frac{1}{(1+MER_i)^{i+b-1}}.$$

3. The method as defined in claim 2, wherein each of the investment growth factors $IF_i$ has a value equal to $(1+MER_i)^{i+b-1}$.

4. The method as defined in claim 3, wherein the respective $MER_i$ for each of the investment vehicles is determined from the actual returns of the respective investment vehicle during preceding intervals.

5. The method as defined in claim 1, wherein the respective $MER_i$ for each of the investment vehicles is determined from the actual returns of the respective investment vehicle during preceding intervals.

6. The method as defined in claim 5 above, wherein $$NF = \sum_{i=1}^{N} \frac{1}{(1+MER_i)^{i+b-1}}.$$

7. The method as defined in claim 6, wherein each of the investment growth factors $IF_i$ has a value equal to $(1+MER_i)^{i+b-1}$.

8. A computerized method of investing a lump sum, V, to provide respective payments, $P_i$, at each of N intervals, with a confidence factor, CF, the method comprising the steps:

(a) selecting, from a universe of investment vehicles, a set of candidate investment vehicles;

(b) based on actual returns of each of the candidate investment vehicles during preceding intervals, determining with the confidence factor CF a respective minimum expected return, $MER_i$, for each of the candidate investment vehicles at each of the N intervals;

(c) with each of the N intervals, associating the candidate investment vehicle that is characterized by the greatest value for MERi;

(d) calculating a normalization factor NF;

(e) for each of the N intervals, calculating an investment growth factor $IF_i$; and (f) determining an investment amount $V_i$ equal to $$\frac{V}{IF_i \times NF}$$

corresponding to each of the N intervals.

9. The method as defined in claim 8, comprising the further step:

(g) investing the respective investment amount in the candidate investment vehicle associated with each of the N intervals.

10. The method as defined in claim 8, wherein $$NF = \sum_{i=1}^{N} \frac{1}{(1+MER_i)^{i+b-1}}.$$

11. The method as defined in claim 10, wherein each of N investment
growth factors $IF_i$ has a value equal to $(1+MER_i)^{i+n-1}$.

12. The method as defined in claim 11, comprising the further step:
(g) investing the respective investment amount in the candidate investment vehicle associated with each of the N intervals.

13. A computer program product including a computer usable medium having a computer readable program code embodied therein for determining investment amounts, which investment amounts represent respective portions of a lump sum, the amounts to be invested in investment vehicles so as to provide payments at N periodic intervals at a predetermined confidence level, the computer program product comprising:
computer readable program code for determining, at a predetermined confidence level, the minimum expected return ($MER_i$) of each investment vehicle of a preselected set of investment vehicles at each of the N periodic intervals;
for each of the N periodic intervals, computer readable program code for identifying the investment vehicle that is characterized by the greatest $MER_i$; and
computer readable program code for allocating an investment portion to each of the identified investment vehicles, where the investment portion is determined by the $MER_i$ of the investment vehicle to which the investment portion is allocated and where the total of the allocated investment portions is substantially equal to the lump sum.

14. The computer program product as defined in claim 13, wherein the investment portion allocated to each identified investment vehicle is inversely proportional to an investment growth factor that is based on the $MER_i$ of the investment vehicle.

15. The computer program product as defined in claim 13, wherein the program product is operable to receive data regarding the actual returns of each of the investment vehicles.

16. The computer program product as defined in claim 15, wherein the investment portion allocated to each identified investment vehicle is inversely proportional to an investment growth factor that is based on the $MER_i$ of the investment vehicle.

17. The computer program product as defined in claim 16, wherein the portion allocated to each identified investment vehicle is equal to a normalized fraction of the lump sum multiplied by the inverse of the investment growth factor.

18. A computerized system for allocating portions of a lump sum to investment vehicles so as to enable investment installments at N intervals, with the first investment installment to be made at a time interval b from the investment allocation, at a predetermined confidence interval, the system comprising:
a processor;
a data storage device, in electrical communication with said processor, storing a computer program product having code to determine, at the predetermined confidence level, the minimum expected return at each of in N intervals ($MER_i$), of each of the investment vehicles, and code, for each of the N periodic intervals, to identify the investment vehicle that provides the greatest $MER_i$, and code to allocate an investment portion to each of the investment vehicles identified in (ii) above, where the investment portion is determined by the $MER_i$ of the investment vehicle to which the investment portion is allocated and where the sum of the allocated investment portions is substantially equal to the lump sum.

19. The system as defined in claim 18, wherein the program product allocates an investment portion to each identified investment vehicle in inverse proportion to an investment growth factor $IF_i$ that is equal to $(1+MER_i)^{i+b-1}$.

20. The system as defined in claim 19, wherein each allocated investment portion is equal to a normalized fraction of the lump sum multiplied by the inverse of the investment growth factor.

21. A computerized method of investing a lump sum amount, V, so as to realize a series of investment payments at N discrete times with a predetermined confidence level, with the first payment realized b periods subsequent to the investment, the method comprising the steps:
(a) based on historical periodic actual returns, determining a minimum expected normal return (MEQ) for each of a plurality of candidate investment instruments, at the predetermined confidence level;
(b) adjusting the respective MEQs of each of the candidate investment instruments so as to yield a minimum expected return, $MER_i$ at each of the N times, for each of the candidate investment instruments;
(c) for each of the N discrete times, identifying which of the candidate investment instruments exhibits the greatest $MER_i$;
(d) with respect to each of the N discrete times, allocating a portion, Vi, of the lump sum to the candidate investment vehicle that exhibits the greatest $MER_i$ where the allocated portion is determined by the following relationship:

$$V_i = \frac{V}{(1+MER_i)^{i+b-1} \times \sum_{i=1}^{N} \frac{1}{(1+MER_i)^{i+b-1}}}.$$

* * * * *